(12) United States Patent
Lee

(10) Patent No.: US 11,036,317 B2
(45) Date of Patent: Jun. 15, 2021

(54) ROLLER INPUT DEVICE

(71) Applicant: Chicony Electronics Co., Ltd., New Taipei (TW)

(72) Inventor: Yu-Long Lee, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/564,517

(22) Filed: Sep. 9, 2019

(65) Prior Publication Data

US 2020/0201451 A1 Jun. 25, 2020

(30) Foreign Application Priority Data

Dec. 25, 2018 (TW) .................................. 107147046

(51) Int. Cl.
| | |
|---|---|
| *G06F 3/0362* | (2013.01) |
| *G06F 1/16* | (2006.01) |
| *G06F 3/0354* | (2013.01) |
| *G06F 3/03* | (2006.01) |

(52) U.S. Cl.
CPC ............ *G06F 3/0362* (2013.01); *G06F 1/169* (2013.01); *G06F 3/0312* (2013.01); *G06F 3/03543* (2013.01)

(58) Field of Classification Search
CPC .. G06F 3/0362; G06F 3/0312; G06F 3/03543; G06F 1/169
See application file for complete search history.

(56) References Cited

U.S. PATENT DOCUMENTS

| | | | | |
|---|---|---|---|---|
| 9,857,972 | B2 * | 1/2018 | Onitsuka | ............... G06F 3/0362 |
| 2018/0210562 | A1 * | 7/2018 | Kao | ....................... G06F 3/0362 |
| 2018/0373353 | A1 * | 12/2018 | Chang | ...................... H02J 7/32 |

* cited by examiner

*Primary Examiner* — Kenneth B Lee, Jr.
(74) *Attorney, Agent, or Firm* — Muncy, Geissier, Oids & Lowe, P.C.

(57) ABSTRACT

A roller input device includes a housing, a passive member and an active member. A roller is pivotally disposed inside the housing, and the roller includes an annular tooth portion. The passive member is movably disposed inside the housing, and the passive member includes an abutting portion and a first magnetic module. The active member has a second magnetic module, and the active member is disposed inside the housing and operably moved to a first mode or a second mode to make the first magnetic module and the second magnetic module attract each other or make the first magnetic module and the second magnetic module repel each other to drive the passive member to move relative to the housing to a first position or a second position, such that the abutting portion and the annular tooth portion abut against or separate from each other.

22 Claims, 11 Drawing Sheets

ROLLER INPUT DEVICE

CROSS-REFERENCE TO RELATED APPLICATION

This non-provisional application claims priority under 35 U.S.C. § 119(a) to Patent Application No. 107147046 filed in Taiwan, R.O.C. on Dec. 25, 2018, the entire contents of which are hereby incorporated by reference.

BACKGROUND

Technical Field

The instant disclosure relates to an input device and, more particularly, to a roller input device.

Related Art

In general, computers cooperate with roller input devices, e.g., the roller input device can be disposed on a keyboard or a mouse, to perform operations such as dragging, rolling pages up and down, or switching menus by the roller input devices.

A usual roller input device generally includes a roller and a resilient ball. A body of the roller is provided with a tooth surface. The resilient ball includes a spring and a metal ball connected to an end of the spring. By the resilient ball abutting against the tooth surface of the body of the roller, the roller can produce a sectional touch feel while the roller is operated to rotate. For example, while the roller is rotated by one scale, the operator would sense a touch feel of pause, which results in a page on a screen being rolled by certain distance. Nonetheless, such roller input device of sectional type cannot satisfy certain scenarios of use (e.g., the roller needs to be rolled for a long time or a long distance, or the rolling operation needs to be more sophisticated).

SUMMARY

To address the above issue, an embodiment provides a roller input device comprising a housing, a passive member, and an active member. An interior of the housing is provided with a roller pivotally disposed therein. The roller comprises an annular tooth portion. The passive member is movably disposed inside the housing, and the passive member comprises an abutting portion and a first magnetic module. The active member comprises a second magnetic module, and the active member is disposed in the housing and operably moved to a first mode or a second mode to make the first magnetic module and the second magnetic module attract or repel each other to drive the passive member to move relative to the housing to a first position or a second position, so as to make the abutting portion and the annular tooth portion abut against or separate from each other.

Concisely, according to the roller input device of the embodiment of the instant disclosure, by the active member being moved relative to the housing to make the first magnetic module and the second magnetic module attract or repel each other, the passive member can be driven by magnetism to move relative to the housing to make the abutting portion and the annular tooth portion separate from or abut against each other, so as to switch the roller to a non-sectional mode or a sectional mode to satisfy users' different needs of operation.

DETAILED DESCRIPTION

Figure 1:
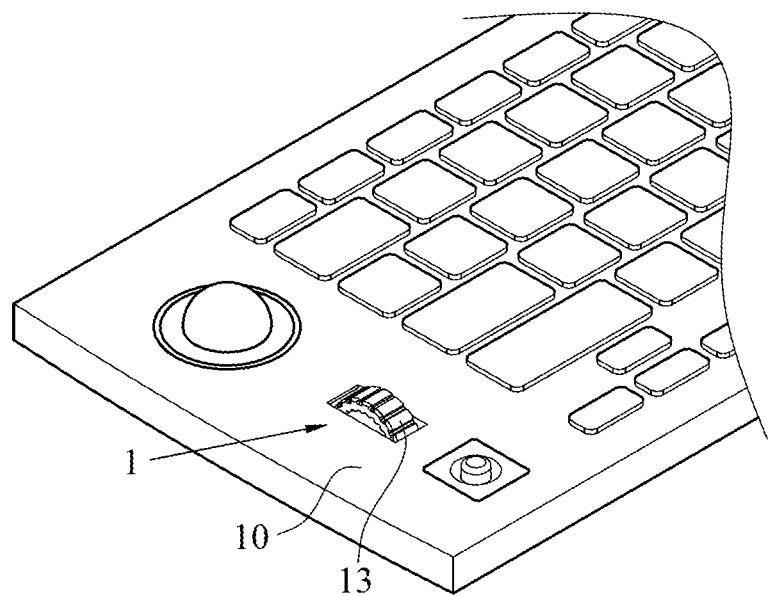
FIG. 1 illustrates an application diagram of a roller input device according to an embodiment of the instant disclosure.
Figure 2:
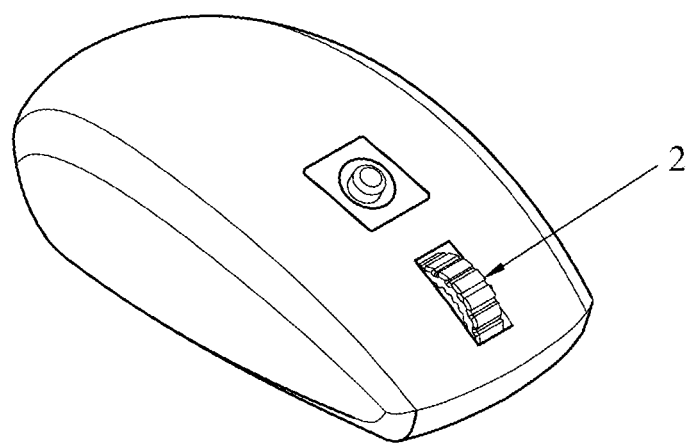
FIG. 2 illustrates an application diagram of a roller input device according to another embodiment of the instant disclosure.

FIG. 1 is an application diagram of a roller input device according to an embodiment of the instant disclosure. FIG. 2 is an application diagram of a roller input device according to another embodiment of the instant disclosure. As shown in FIG. 1, a roller input device 1 of the embodiment of the instant disclosure is an input device of a computer for performing operations of pages of the computer (e.g., as dragging, rolling pages up and down, or switching menus). In the embodiment, the roller input device 1 is integrated into a computer keyboard. In another embodiment, as shown in FIG. 2, a roller input device 2 may also be applied to a computer mouse, but is not limited thereto.

Figure 3:
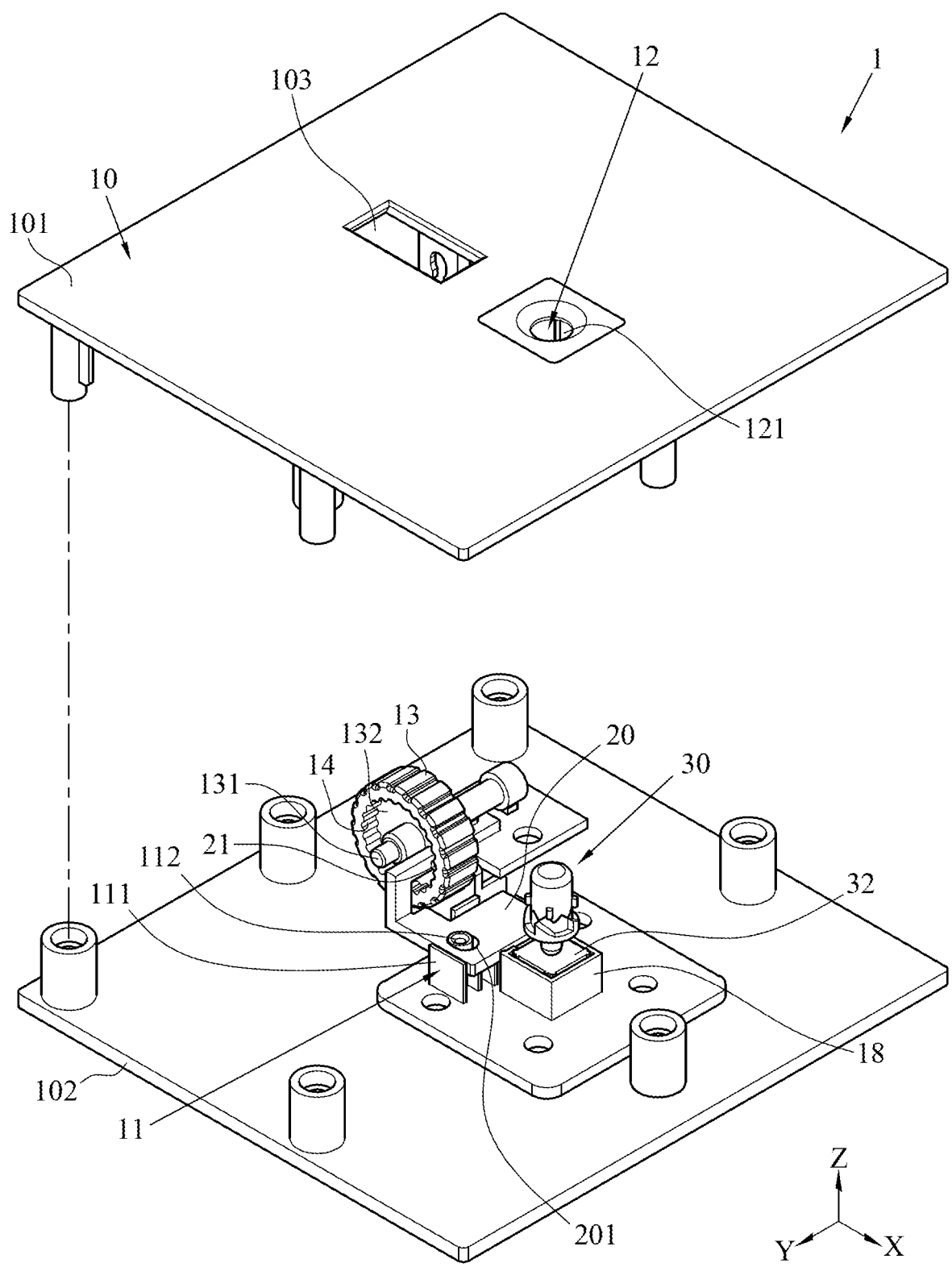
FIG. 3 illustrates an exploded perspective view of a roller input device according to the first embodiment of the instant disclosure.
Figure 4:
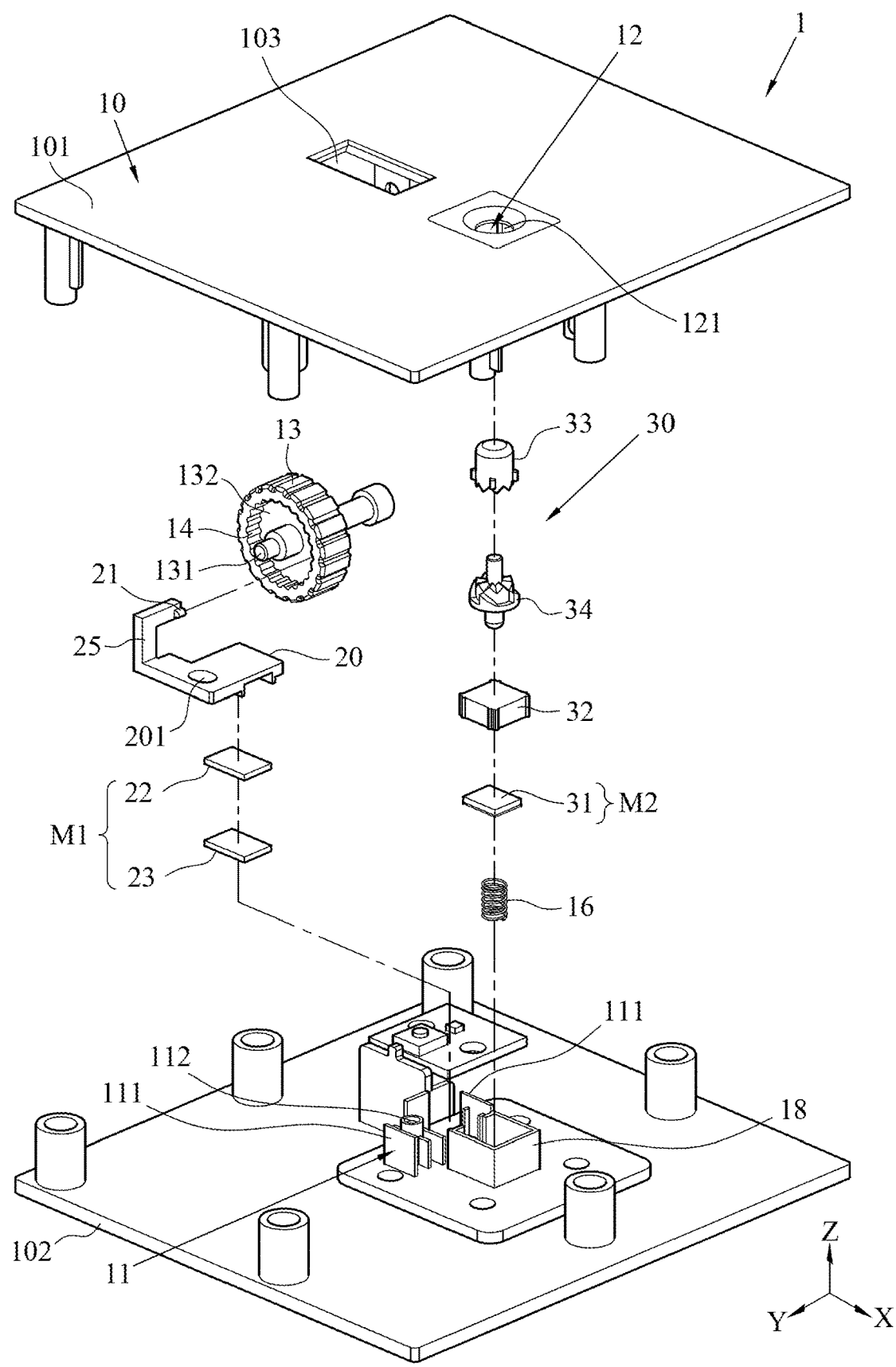
FIG. 4 illustrates another exploded perspective view of the roller input device according to the first embodiment of the instant disclosure.

As shown in FIG. 1, FIG. 3, and FIG. 4, FIG. 3 is an exploded perspective view of a roller input device according to the first embodiment of the instant disclosure, and FIG. 4 is another exploded perspective view of the roller input device according to the first embodiment of the instant disclosure. In the embodiment, of the instant disclosure, the roller input device 1 comprises a housing 10, a passive member 20, and an active member 30. In the embodiment, the housing 10 is, but is not limited to, assembled by an upper housing 101 and a lower housing 102. An interior of the housing 10 is provided with a first guide member 11 and a second guide member 12. The interior of the housing 10 is further provided with a roller 13 pivotally disposed therein.

Figure 5:
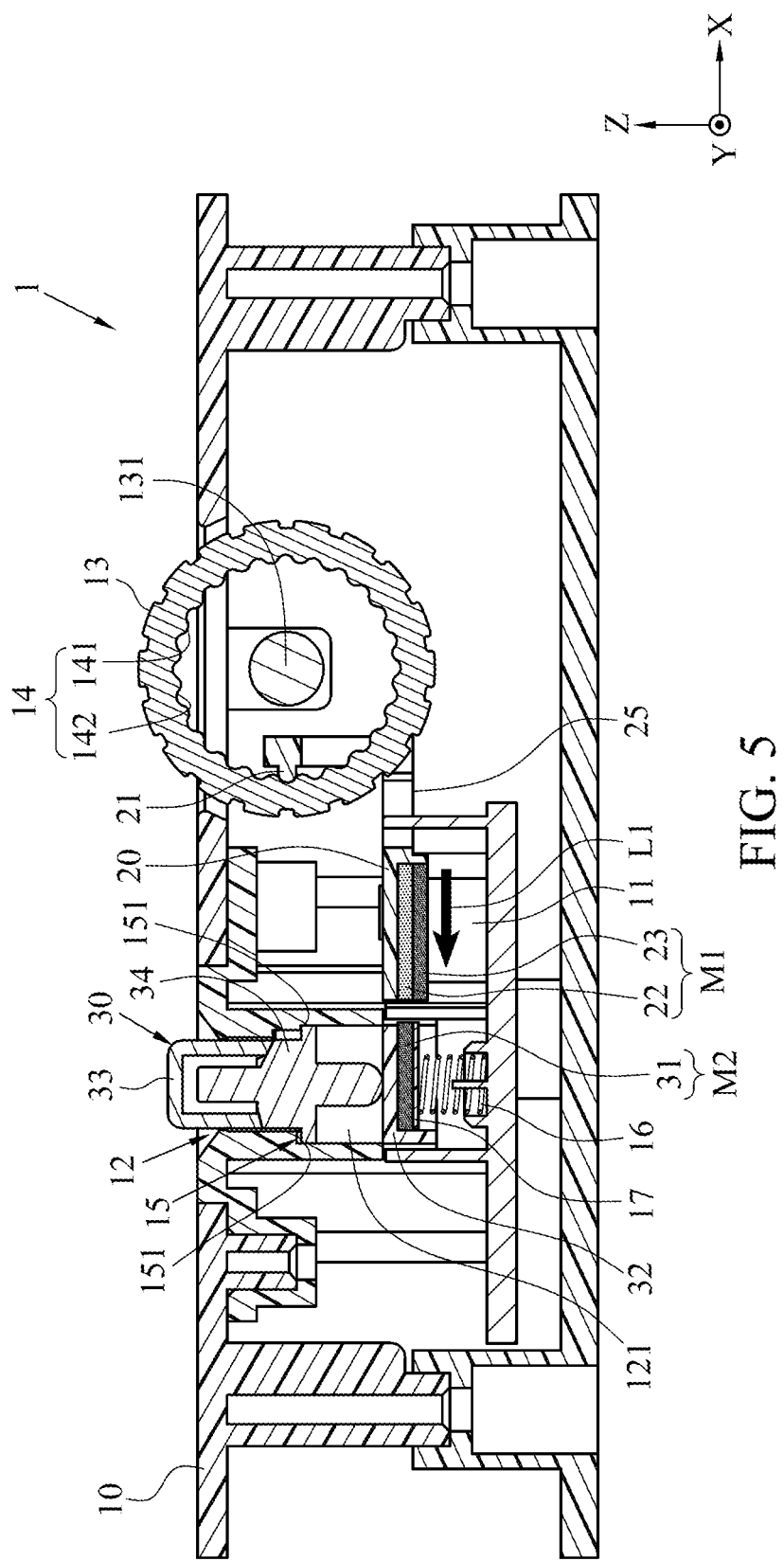
FIG. 5 illustrates a cross-sectional view of the roller input device according to the first embodiment of the instant disclosure.

As shown in FIG. 1, FIG. 3, and FIG. 4, in the embodiment, the roller 13 is provided with a pivot axle 131 to be pivotally disposed on the interior of the housing 10 by the pivot axle 131. The housing 10 is provided with a through hole 103. A part of the roller 13 penetrates through the through hole 103, such that a part of the roller 13 is exposed from the housing 10 to outside which allows a user to operate. For example, the roller 13 can be operated to roll to perform operations of rolling pages up and down. In addition, the roller 13 comprises an annular tooth portion 14. The annular tooth portion 14 may be disposed on a periphery of the roller 13. For example, in the embodiment, the roller 13 is provided with a laterally annular slot 132. The annular tooth portion 14 is, but is not limited to, disposed along an outer periphery of the laterally annular slot 132. In some embodiments, the annular tooth portion 14 may also be disposed on an inner periphery of the laterally annular slot 132 or an outer periphery of the pivot axle 131 of the roller 13. Please refer to FIG. 5, which is a cross-sectional view of the roller input device according to the first embodiment of the instant disclosure. In the embodiment, the annular tooth portion 14 of the roller 13 is consisted of continuous concave-convex structures. The annular tooth portion 14 comprises a plurality of convex teeth 141 in an annular arrangement, and a slot 142 is formed between every two adjacent convex teeth 141. In some embodiments, a cross section of each convex tooth 141 or each slot 142 may be of an arc shape (as shown in FIG. 5), a rectangular shape, a trapezoid shape, or other shapes, but is not limited thereto.

The passive member 20 of the roller input device 1 is movably disposed inside the housing 10. For example, the passive member 20 is slidably disposed on the guide member inside the housing 10 and is capable of sliding relative to the housing 10. Alternatively, the passive member 20 may also be pivotally disposed inside the housing 10 and is capable of swinging relative to the housing 10. For instance, as shown in FIG. 3 and FIG. 4, in the embodiment, the passive member 20 is slidably disposed on the first guide member 11, and the first guide member 11 is disposed on a side of the roller 13 and comprises two guide plates 111 spaced from each other and a guide pillar 112. The guide pillar 112 is between the two guide plates 111. The passive member 20 is a sliding seat and is slidably disposed between the two guide plates 111, such that the passive member 20 is capable of sliding to be close to or away from the roller 13 relative to the two guide plates 111. In the embodiment, the passive member 20 is further provided with a long slot 201. An extending direction of the long slot 201 is the same as the sliding direction of the passive member 20 (the X direction in the drawing). The guide pillar 112 of the first guide member 11 penetrates into the long slot 201 of the passive member 20, such that in the process of the passive member 20 sliding relative to the first guide member 11, the passive member 20 can be restricted by the guide pillar 112 and thus can be more stable. In some embodiments, the first guide member 11 can be a guide structure of other type. For example, the first guide member 11 can be a sliding rail or a sliding slot for the passive member 20 to slide.

The active member 30 of the roller input device 1 is movably disposed on the second guide member 12 inside the housing 10, such that the active member 30 can be moved relative to the second guide member 12 to a first mode or a second mode. It is described later. As shown in FIG. 3, FIG. 4, and FIG. 5, in the embodiment, the first guide member 11 is disposed between the second guide member 12 and the roller 13. The second guide member 12 comprises a sliding slot 121. The sliding slot 121 penetrates through the housing 10 and is communicated with the interior of the housing 10. In the embodiment, the penetrating direction of the sliding slot 121 is, but is not limited to, the same as that of the through hole 103. The sliding slot 121 may also penetrate through the housing 10 along other directions. The active member 30 is a press button and is movably disposed in the sliding slot 121 to be moved relative to the sliding slot 121 to be away from or close to the passive member 20.

As shown in FIG. 1, FIG. 3, and FIG. 4, the passive member 20 comprises an abutting portion 21 and a first magnetic module M1. In the embodiment, the first magnetic module M1 comprises a first magnetic member 22 and a second magnetic member 23. An end of the passive member 20 of the embodiment close to the roller 13 comprises an extending arm 25. The extending arm 25 extends towards the annular tooth portion 14 of the roller 13. A distal end of the extending arm 25 is close to the annular tooth portion 14. The abutting portion 21 is a convex portion disposed on the distal end of the extending arm 25. While the passive member 20 slides relative to the first guide member 11, the abutting portion 21 may abut against or separate from the annular tooth portion 14. The first magnetic member 22 and the second magnetic member 23 of the first magnetic module M1 are disposed on an end of the passive member 20 away from the roller 13. In the embodiment, the first magnetic member 22 and the second magnetic member 23 are arranged along a specific direction. The specific direction is the same as a guiding direction of the second guide member 12. For example, in the embodiment, the sliding slot 121 of the second guide member 12 penetrates through the housing 10 along the Z direction, such that a guiding direction of the sliding slot 121 (i.e., the Z direction) is perpendicular to the sliding direction of the passive member 20. The first magnetic member 22 and the second magnetic member 23 are arranged along the Z direction (in the embodiment, the first magnetic member 22 and the second magnetic member 23 overlap and are fixed to each other). In addition, the first magnetic member 22 and the second magnetic member 23 have different magnetism. For instance, the first magnetic member 22 and the second magnetic member 23 may be magnets, and end portions of the first magnetic member 22 and the second magnetic member 23 are opposite poles. For example, the magnetic pole of an end portion of the first magnetic member 22 away from the roller 13 is N pole, and the magnetic pole of an end portion of the second magnetic member 23 away from the roller 13 is S pole.

As shown in FIG. 3 to FIG. 5, the active member 30 comprises a second magnetic module M2. In the embodiment, the second magnetic module M2 comprises a third magnetic member 31. A bottom end of the active member 30 of the embodiment comprises a lifting seat 32. The third magnetic member 31 is fixed to the lifting seat 32. The lifting seat 32 is disposed in a guide slot 18 of the lower housing 102 and is capable of lifting and descending. The lifting seat 32 is spaced from an end of the passive member 20 away from the roller 13. The third magnetic member 31 and the first magnetic member 22 have different magnetism and attract each other. For example, ends of the third magnetic member 31 and the first magnetic member 22 close to each other are opposite poles. The third magnetic member 31 and the second magnetic member 23 have the same magnetism and repel each other. For example, ends of the third magnetic member 31 and the second magnetic member 23 close to each other are like poles. While the active member 30 is moved relative to the second guide member 12 to the first mode or the second mode, the third magnetic member 31 and the first magnetic member 22 are close to and attract each other or the third magnetic member 31 and the second magnetic member 23 are close to and repel each other to switch the roller 13 to a sectional mode or a non-sectional mode. The illustration cooperating with the drawings are as follows.

As shown in FIG. 5, while the active member 30 is moved relative to the second guide member 12 to the first mode to make the third magnetic member 31 be close to the first magnetic member 22 and the third magnetic member 31 and the first magnetic member 22 attract each other, the magnetic attractive force generated by the third magnetic member 31 and the first magnetic member 22 can drive the passive member 20 to slide relative to the first guide member 11 towards a direction away from the roller 13 (as the arrow L1 shown in FIG. 5) to a first position (as the position of the passive member 20 shown in FIG. 5), such that the abutting portion 21 tends to abut against the annular tooth portion 14 of the roller 13 and the sectional mode is presented. In the sectional mode, the roller 13 produces a sectional touch feel while the roller 13 is operated to rotate. For example, while the roller 13 rotates, the abutting portion 21 crosses over the convex tooth 141 from one of the slots 142 of the annular tooth portion 14 to abut against another one of the slots 142 to make the user sense a touch feel of pause.

Figure 6:
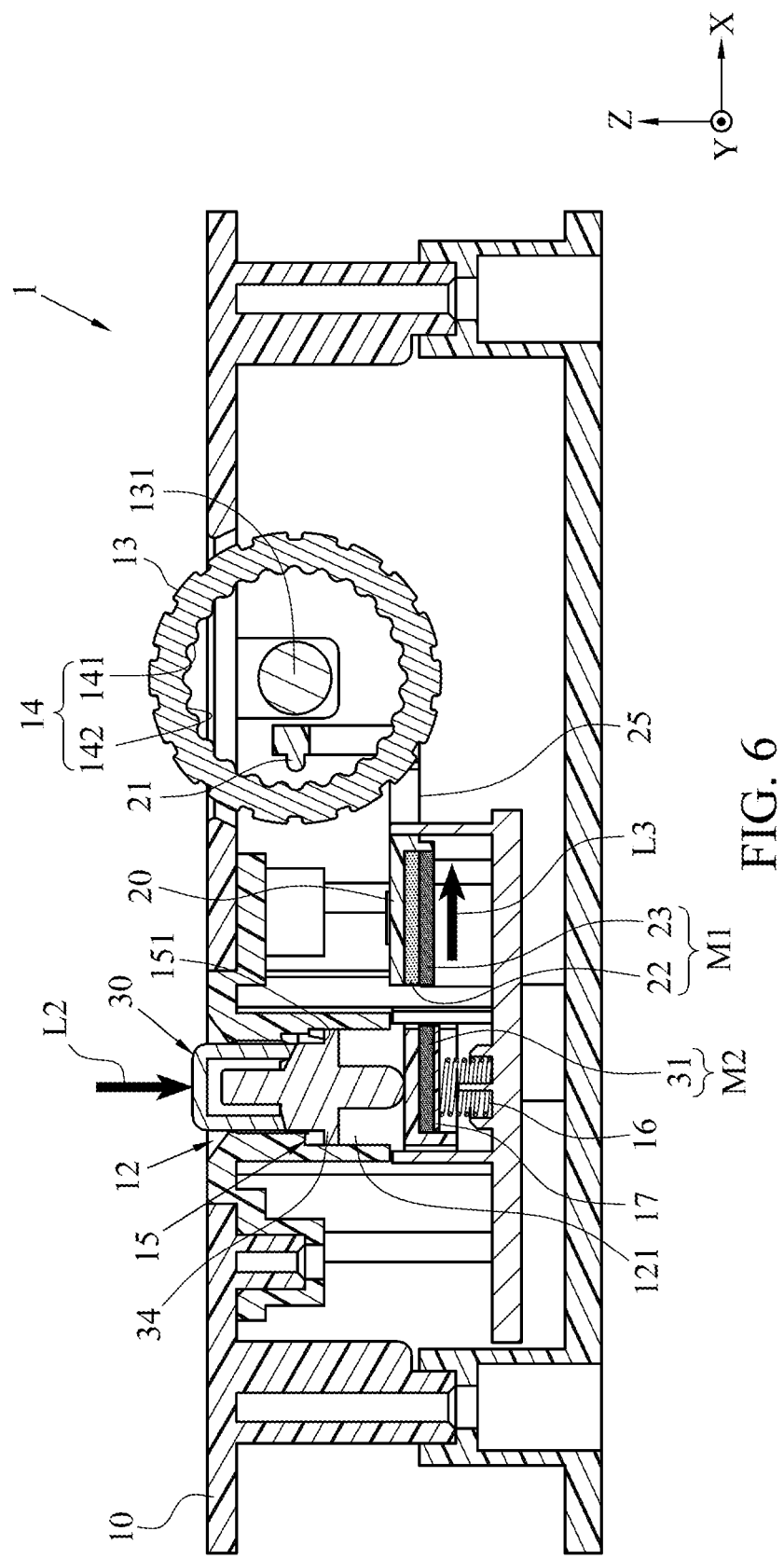
FIG. 6 illustrates an operational diagram of the roller input device according to the first embodiment of the instant disclosure.

As shown in FIG. 6, FIG. 6 is an operational diagram of the roller input device according to the first embodiment of the instant disclosure. While the active member 30 is moved relative to the second guide member 12 to the second mode (as shown by the arrow L2, the active member 30 can be pressed by the user and be moved towards the interior of the housing 10) to make the third magnetic member 31 be close to the second magnetic member 23 and make the third magnetic member 31 and the second magnetic member 23 repel each other, the magnetic repulsive force generated by the third magnetic member 31 and the second magnetic member 23 can drive the passive member 20 to slide relative to the first guide member 11 towards the roller 13 (as the arrow L3 shown in FIG. 6) to a second position (as the position of the passive member 20 shown in FIG. 6), such that the abutting portion 21 separates from the annular tooth portion 14 of the roller 13 and the non-sectional mode is presented. In the non-sectional mode, since the abutting portion 21 does not abut against the annular tooth portion 14, the roller 13 can be operated to rotate without resistance and can be used to perform a fast rotation or a more sophisticated operation to satisfy certain scenarios of use (e.g., the roller needs to be rolled for a long time or a long distance, or the rolling operation needs to be more sophisticated).

The above embodiments are not used to limit the invention. In some embodiments, the ends of the third magnetic member 31 and the first magnetic member 22 close to each other are like poles, and the ends of the third magnetic member 31 and the second magnetic member 23 close to each other are opposite poles. Whereby, while the active member 30 is moved relative to the second guide member 12 to the aforementioned first mode to make the third magnetic member 31 and the first magnetic member 22 be close to and repel each other, the magnetic repulsive force generated by the third magnetic member 31 and the first magnetic member 22 can drive the passive member 20 to slide relative to the first guide member 11 towards the roller 13 to the aforementioned second position, such that the abutting portion 21 separates from the annular tooth portion 14 of the roller 13 and the non-sectional mode is presented. While the active member 30 is moved relative to the second guide member 12 to the second mode to make the third magnetic member 31 and the second magnetic member 23 be close to and attract each other, the magnetic attractive force generated by the third magnetic member 31 and the second magnetic member 23 can drive the passive member 20 to slide relative to the first guide member 11 towards the direction away from the roller 13 to the aforementioned first position, such that the abutting portion 21 tends to abut against the annular tooth portion 14 of the roller 13 and the sectional mode is presented.

As shown in FIG. 5 and FIG. 6, in the embodiment, the abutting portion 21 of the distal end of the extending arm 25 of the passive member 20 is close to a side of the annular tooth portion 14 close to the active member 30 (hereinafter called "the near side"), such that while the active member 30 is moved to the aforementioned first mode or the second mode, the abutting portion 21 abuts against or separates from the near side of the annular tooth portion 14. In another embodiment, as shown in FIG. 7 and FIG. 8, which are a cross-sectional view and an operational diagram of a roller input device according to the second embodiment of the instant disclosure, the abutting portion 21a of the distal end of the extending arm 25 of the passive member 20 of the roller input device 3 is close to a side of the annular tooth portion 14 away from the active member 30 (hereinafter called "the remote side").

Figure 7:
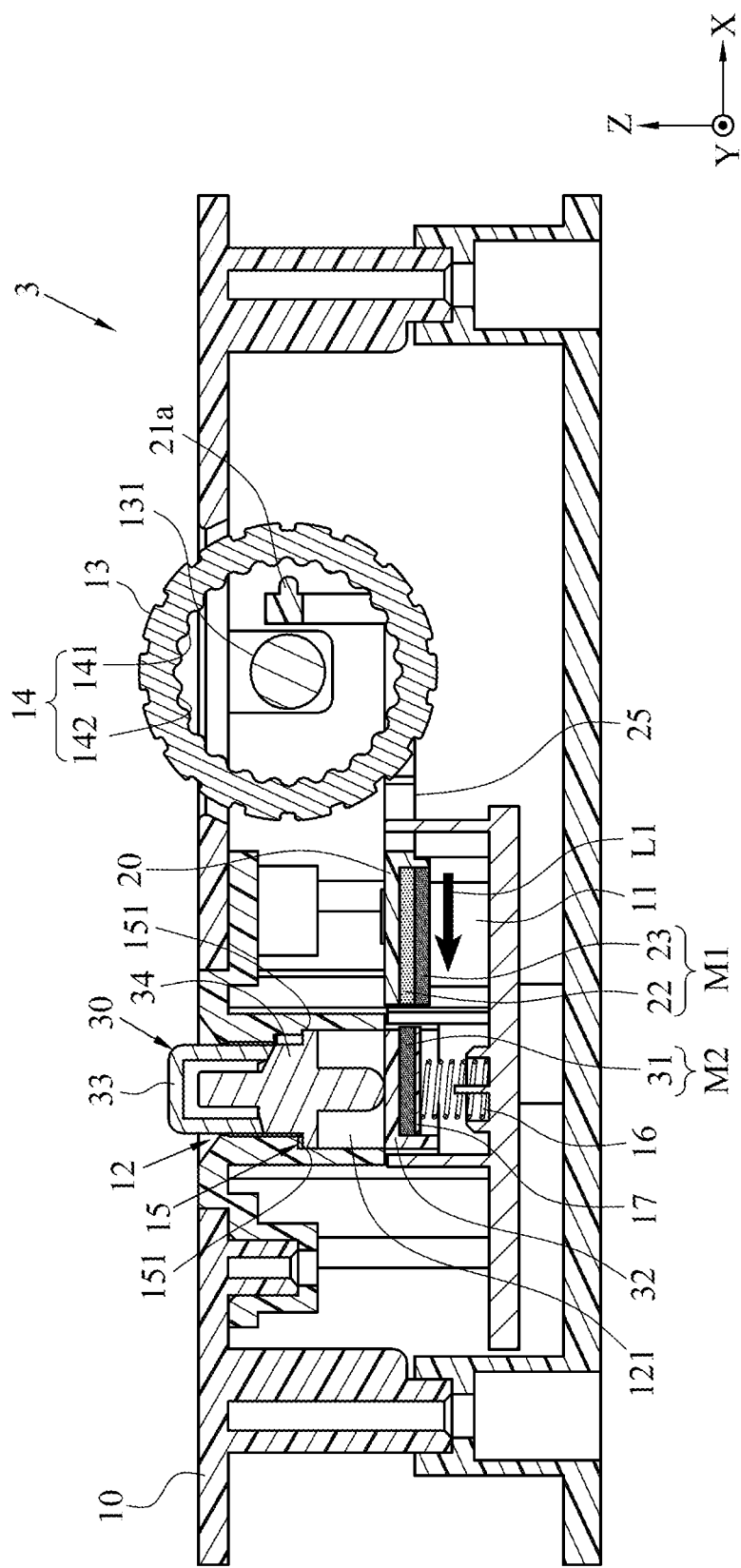
FIG. 7 illustrates a cross-sectional view of a roller input device according to the second embodiment of the instant disclosure.

As shown in FIG. 7, in the embodiment, the ends of the third magnetic member 31 and the first magnetic member 22 close to each other are opposite poles, and the ends of the third magnetic member 31 and the second magnetic member 23 close to each other are like poles. While the active member 30 is moved to the aforementioned first mode to make the third magnetic member 31 and the first magnetic member 22 be close to and attract each other, the abutting portion 21a instead separates from the remote side of the annular tooth portion 14 of the roller 13 and the non-sectional mode is presented. As shown in FIG. 8, while the active member 30 is moved to the aforementioned second mode to make the third magnetic member 31 and the second magnetic member 23 be close to and repel each other, the abutting portion 21a tends to abut against the remote side of the annular tooth portion 14 of the roller 13 and the sectional mode is presented.

Figure 8:
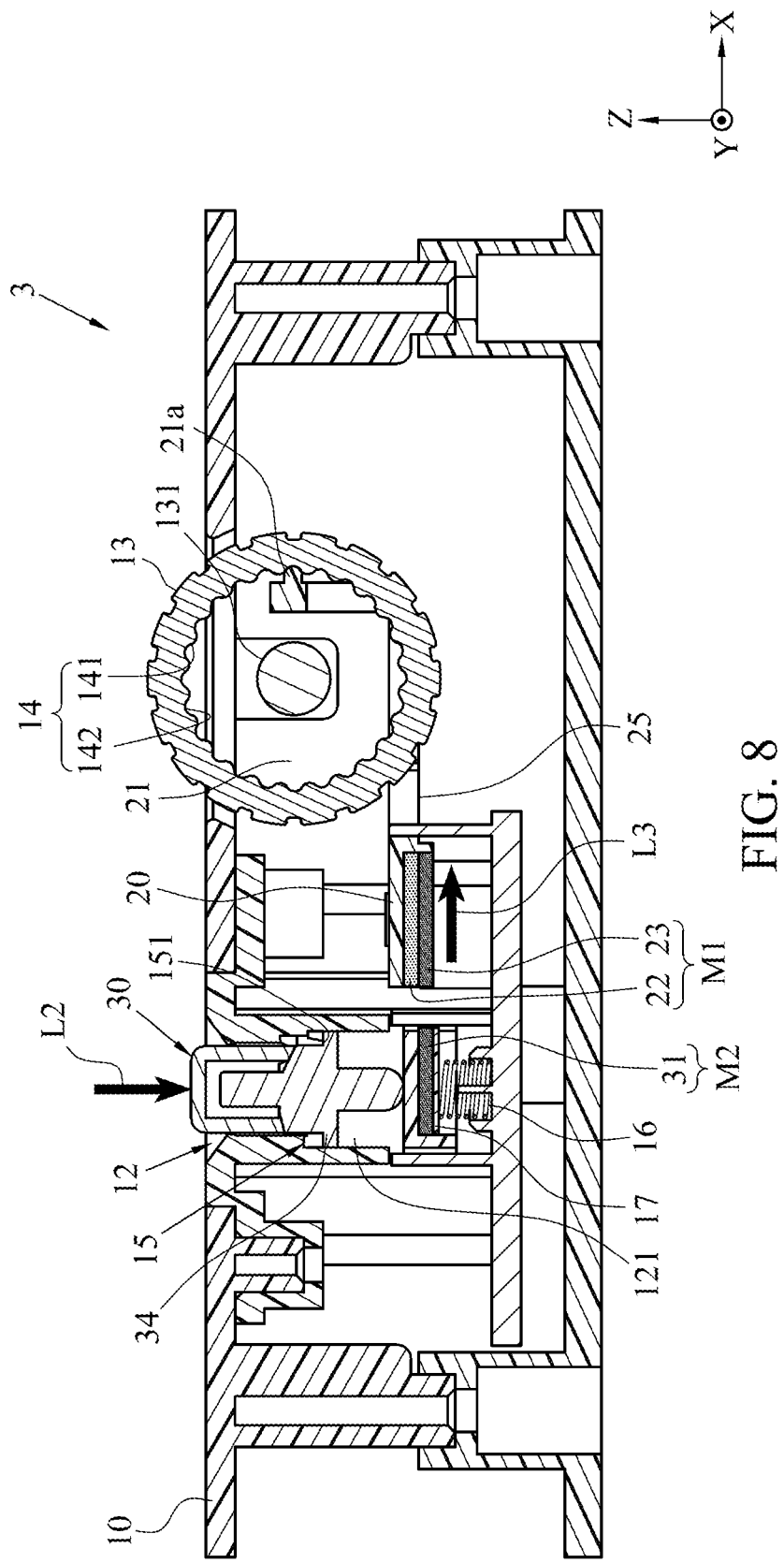
FIG. 8 illustrates an operational diagram of the roller input device according to the second embodiment of the instant disclosure.

Nonetheless, in the embodiment of FIG. 7 and FIG. 8, the ends of the third magnetic member 31 and the first magnetic member 22 close to each other can also be like poles, and the ends of the third magnetic member 31 and the second magnetic member 23 close to each other can also be opposite poles. Whereby, while the active member 30 is slid to the aforementioned first mode to make the third magnetic member 31 and the first magnetic member 22 be close to and repel each other, the abutting portion 21a abuts against the remote side of the annular tooth portion 14 of the roller 13 and the sectional mode is presented. While the active member 30 is slid to the aforementioned second mode to make the third magnetic member 31 and the second magnetic member 23 be close to and attract each other, the abutting portion 21a separates from the remote side of the annular tooth portion 14 of the roller 13 and the non-sectional mode is presented.

Based on the configuration of the roller input device 1 of the embodiments of the instant disclosure, the active member 30 can be moved relative to the second guide member 12 to make the third magnetic member 31 and the second magnetic member 23 be close to and repel each other or make the third magnetic member 31 and the first magnetic member 22 be close to and attract each other to drive the passive member 20 to move relative to the first guide member 11 by magnetic force, such that the abutting portion 21 separates from the annular tooth portion 14 or abuts against the annular tooth portion 14, so as to switch the roller 13 to the non-sectional mode or the sectional mode to satisfy users' different needs of operation.

In some embodiments, the second guide member 12 in the housing 10 may be provided with a restriction mechanism 15. The restriction mechanism 15 restricts the active member 30 to the aforementioned first mode or second mode. As shown in FIG. 4 and FIG. 5, in the embodiment, the active member 30 is a switch button and further comprises a press head 33 and a rotary claw table 34. The press head 33 is exposed from the sliding slot 121 which allows the user to press. The rotary claw table 34 is located in the sliding slot 121 and against between the press head 33 and the lifting seat 32. The interior of the housing 10 is further provided with a resilient return member 16. In the embodiment, the resilient return member 16 is a spring. Nonetheless, the resilient return member 16 may also be a resilient body such as a resilient piece or a resilient rubber. The resilient return member 16 abuts against the third magnetic member 31 to provide a resilient force towards the press head 33 to make the rotary claw table 34 continuously abut against the press head 33. A protective layer 17 is disposed between the third magnetic member 31 and the resilient return member 16. The protective layer 17 may be a metal layer or a plastic layer to prevent the third magnetic member 31 from scratching or damaging to adversely affect the magnetism. The restriction mechanism 15 of the second guide member 12 may be disposed on an annular guide rail of the sliding slot 121. The restriction mechanism 15 comprises a plurality of block portions 151 located at different elevations. While the active member 30 is at the first mode (as shown in FIG. 5), the rotary claw table 34 may abut against one of the block portions 151 to restrict the active member 30. In the process of the press head 33 of the active member 30 being pressed and moved from the first mode (as shown in FIG. 5) to the second mode (as shown in FIG. 6), the rotary claw table 34 is guided by the restriction mechanism 15 (i.e., the annular guide rail) to rotate to abut against another block portion 151 and to make the active member 30 restricted to the second mode. Simultaneously, the rotary claw table 34 abuts against the lifting seat 32 to drive the third magnetic member 31 to compress the resilient return member 16 to accumulate resilient force. Whereby, while the press head 33 of the active member 30 is pressed again, the rotary claw table 34 is guided by the restriction mechanism 15 (i.e., the annular guide rail) to rotate and is against by the resilient force accumulated by the resilient return member 16, such that the active member 30 returns to the first mode from the second mode.

Nonetheless, the above embodiments are merely examples. In other embodiments, the active member 30 and the restriction mechanism 15 can also meet the restriction effect in other manner. For example, the restriction mechanism 15 may comprise elastic buckles located at different positions to correspondingly buckle the active member 30 on the first mode or the second mode. Alternatively, the restriction mechanism 15 may be an internal thread, and the active member 30 is provided with an external thread, such that the active member 30 can be moved to and restricted to the first mode or the second mode in a screwing manner. The above embodiment is not shown in the drawings.

Figure 9:
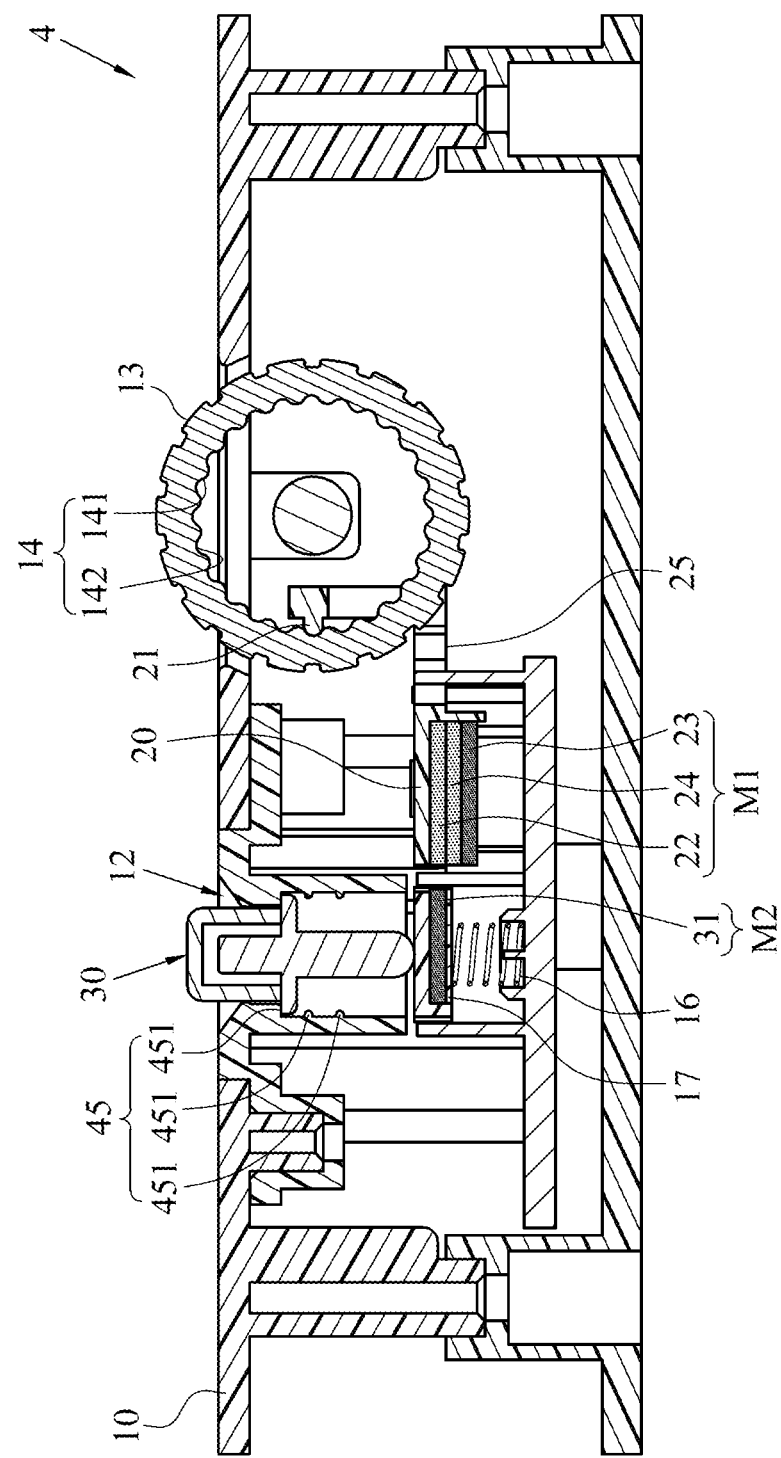
FIG. 9 illustrates a cross-sectional view of a roller input device according to the third embodiment of the instant disclosure.

As shown in FIG. 9, FIG. 9 is a cross-sectional view of a roller input device according to the third embodiment of the instant disclosure. The difference between the embodiment and the first embodiment is that the first magnetic module M1 of the passive member 20 of the roller input device 4 of the embodiment further comprises a fourth magnetic member 24. The first magnetic member 22, the second magnetic member 23, and the fourth magnetic member 24 are arranged in a column. The active member 30 can further be optionally moved to a third mode to make the third magnetic member 31 be close to the fourth magnetic member 24, such that the passive member 20 is slid to a third position, and the strength of the abutting portion 21 abutting against the annular tooth portion 14 can be adjusted. For example, in the embodiment, the fourth magnetic member 24 is clamped between the first magnetic member 22 and the second magnetic member 23, in which the magnetism of the fourth magnetic member 24 is different from that of the first magnetic member 22 or the second magnetic member 23. For instance, an end of the third magnetic member 31 close to the roller 13 is N pole, and ends of the first magnetic member 22 and the fourth magnetic member 24 close to the third magnetic member 31 are S pole. In addition, the magnetism of the fourth magnetic member 24 is greater than that of the first magnetic member 22, and an end of the second magnetic member 23 close to the third magnetic member 31 is N pole. Whereby, the active member 30 can be moved relative to the second guide member 12 to make the third magnetic member 31 be close to the first magnetic member 22 or the fourth magnetic member 24 to produce magnetic attractive force with different level, so as to change the strength of the abutting portion 21 abutting against the annular tooth portion 14 of the roller 13. Consequently, the roller 13 produces different sectional touch feels while the roller 13 is operated to rotate, so as to satisfy users' varied needs of operation In another embodiment, the fourth magnetic member 24 may be away from or close to the third magnetic member 31 relative to the first magnetic member 22 and the second magnetic member 23, such that while the third magnetic member 31 is close to the first magnetic member 22 or the fourth magnetic member 24, magnetic attractive force or magnetic repulsive force with different level can be produced due to different distances. Analogously, the strength of the abutting portion 21 abutting against the annular tooth portion 14 of the roller 13 can be changed.

As shown in FIG. 9, the second guide member 12 of the roller input device 4 of the embodiment is provided with a restriction mechanism 45. The restriction mechanism 45 comprises three block portions 451 radially protruded from the sliding slot 121, in which the three block portions 451 are analogously at different elevations, to make the active member 30 restricted to different modes, so as to make the third magnetic member 31 be close to the first magnetic member 22, the second magnetic member 23, or the fourth magnetic member 24.

Figure 10:
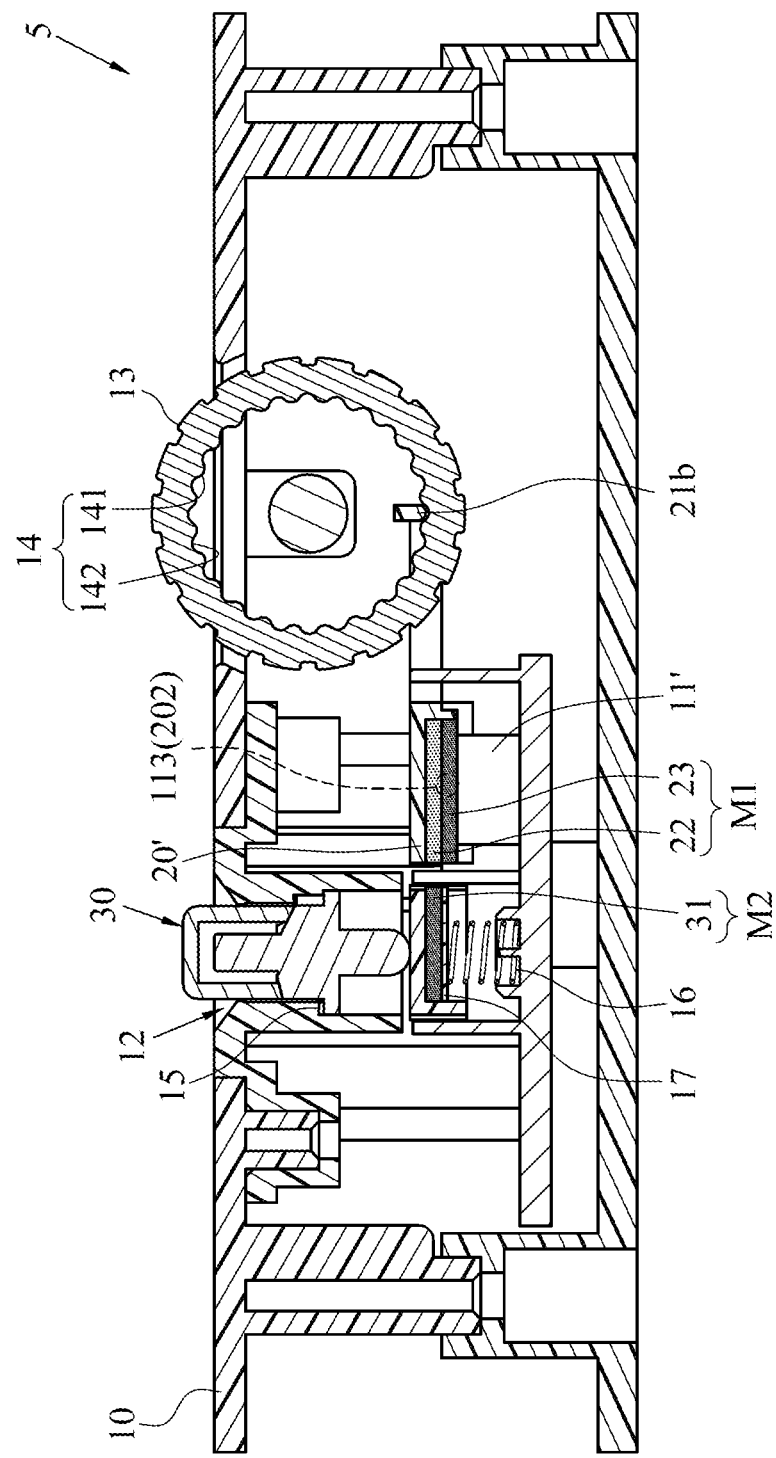
FIG. 10 illustrates a cross-sectional view of a roller input device according to the fourth embodiment of the instant disclosure.

As shown in FIG. 10, FIG. 10 is a cross-sectional view of a roller input device according to the fourth embodiment of the instant disclosure. The difference between the embodiment and the first embodiment is that a first guide member 11' and a passive member 20' of the roller input device 5 of the embodiment are in a pivoting arrangement. In particular, the passive member 20' is provided with a first pivot portion 202, and the first guide member 11' comprises a second pivot portion 113. The passive member 20' is pivotably disposed on the second pivot portion 113 of the first guide member 11' by the first pivot portion 202, such that the passive member 20' can swing relative to the first guide member 11' about the first pivot portion 202.

Figure 11:
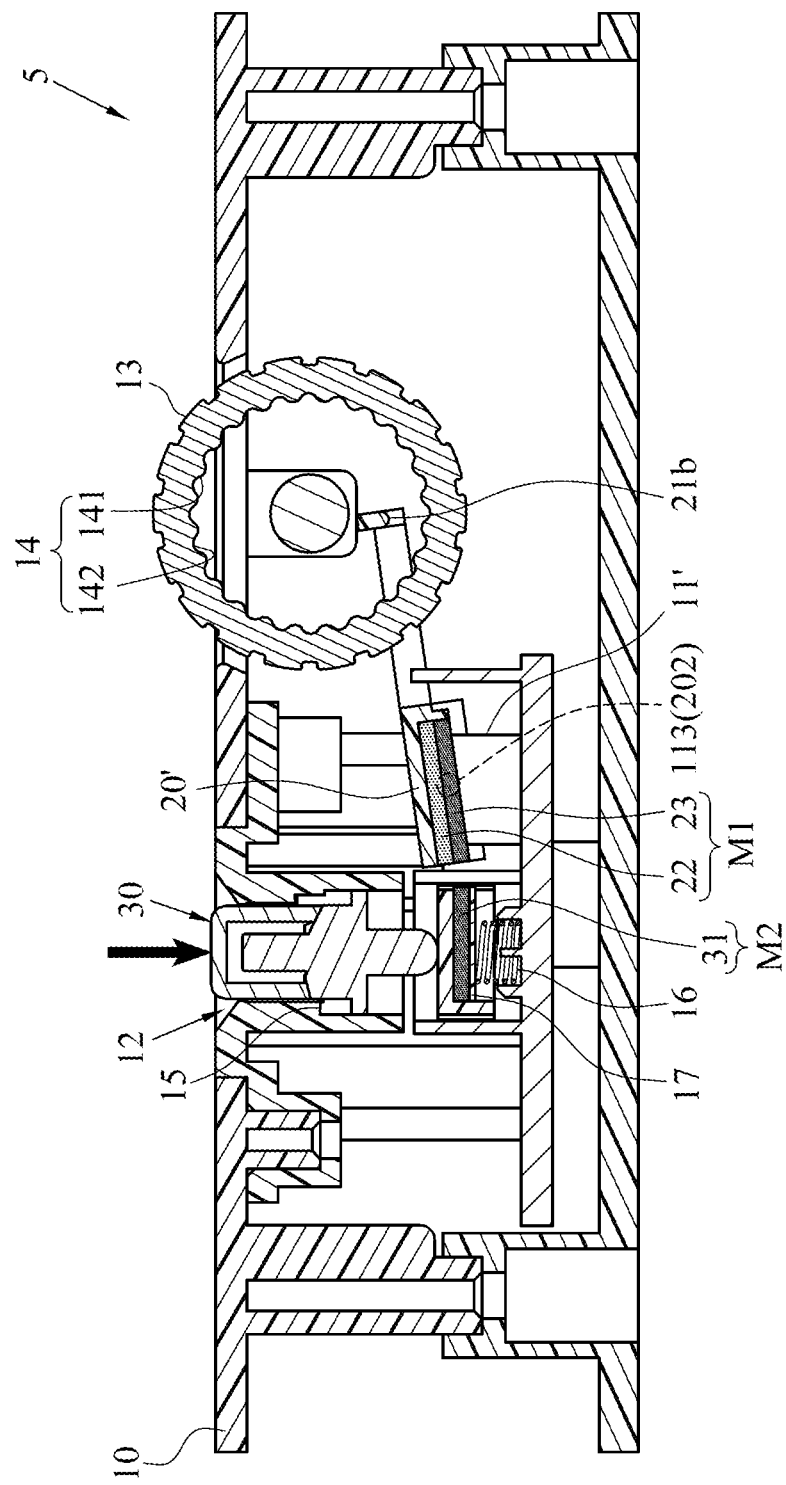
FIG. 11 illustrates an operational diagram of the roller input device according to the fourth embodiment of the instant disclosure.

Whereby, as shown in FIG. 10, while the active member 30 is slid relative to the second guide member 12 to the first mode to make the third magnetic member 31 and the first magnetic member 22 be close to and attract each other, the magnetic attractive force produced by the third magnetic member 31 and the first magnetic member 22 can drive the passive member 20' to swing relative to the first guide member 11' (swinging clockwise in the drawing) to make an abutting portion 21b tend to abut against the annular tooth portion 14 of the roller 13 to present the sectional mode. As shown in FIG. 11, FIG. 11 is an operational diagram of the roller input device according to the fourth embodiment of the instant disclosure. While the active member 30 is slid relative to the second guide member 12 to the second mode and to make the third magnetic member 31 and the second magnetic member 23 be close to and repel each other, the magnetic repulsive force produced by the third magnetic member 31 and the second magnetic member 23 can drive the passive member 20' to swing relative to the first guide member 11' reversely (swinging counterclockwise in the drawing) to make the abutting portion 21b separate from the annular tooth portion 14 of the roller 13 to present the non-sectional mode. In addition, as shown in FIG. 10 and FIG. 11, the abutting portion 21b of the embodiment corresponds to the bottom portion of the annular tooth portion 14 of the roller 13, but it is not limited thereto. The abutting portion 21b can also correspond to other portion of the annular tooth portion 14.

Figure 12:
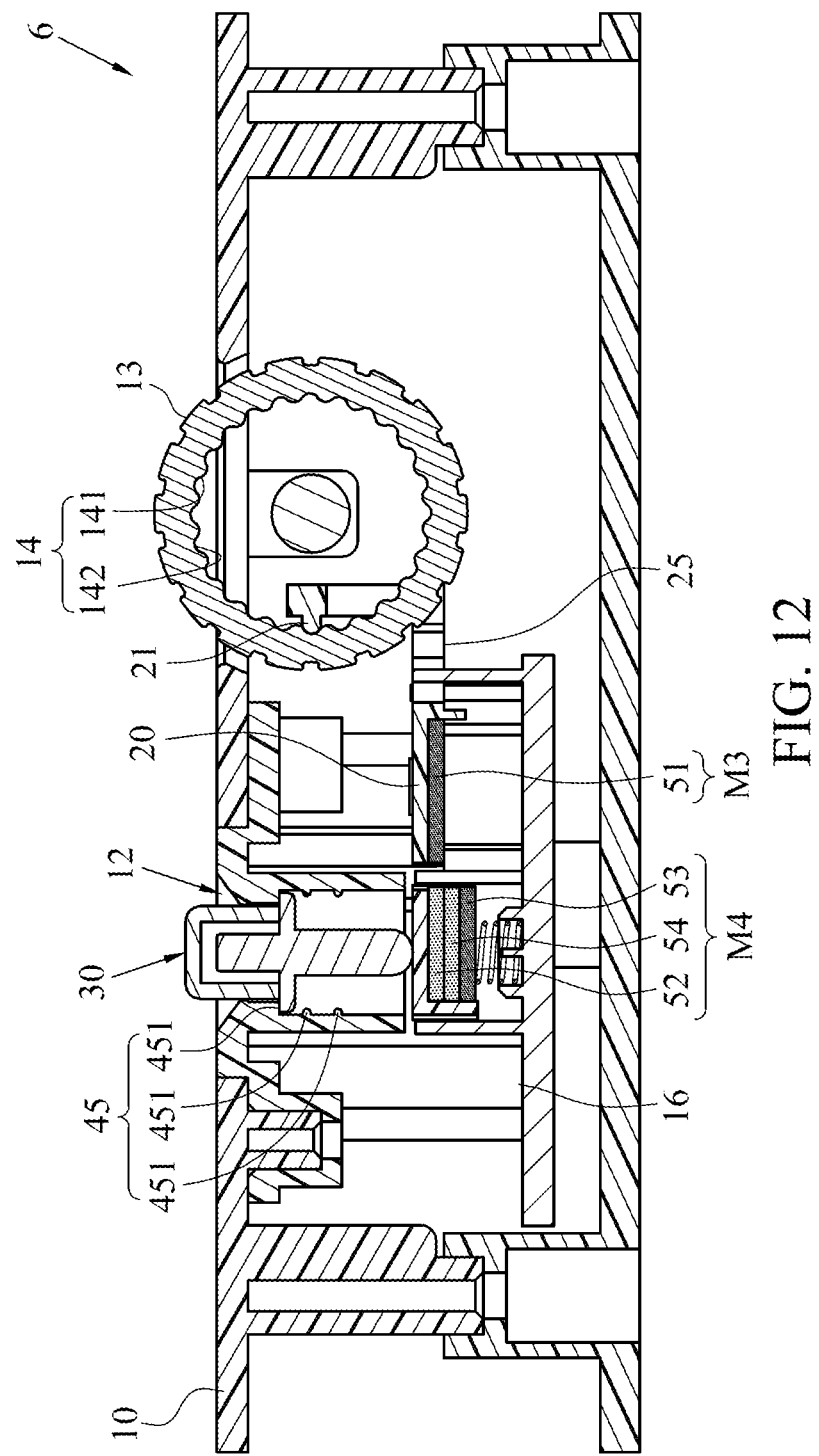
FIG. 12 illustrates a cross-sectional view of a roller input device according to the fifth embodiment of the instant disclosure.

In some embodiments, a second magnetic module M4 of the active member 30 may comprise a plurality of magnetic members, and a first magnetic module M3 of the passive member 20 may comprise one magnetic member, which may also achieve the objective of switching the roller 13 to the sectional mode or the non-sectional mode. As shown in FIG. 12, FIG. 12 is a cross-sectional view of a roller input device according to the fifth embodiment of the instant disclosure. The second magnetic module M4 of the active member 30 of the roller input device 6 in the embodiment may comprise three magnetic members (a first magnetic member 52, a second magnetic member 53, and a fourth magnetic member 54), and the first magnetic module M3 of the passive member 20 may comprise one magnetic member (a third magnetic member 51). Whereby, while the active member 30 is moved and switched to the first mode, the second mode, and the third mode, the third magnetic member 51 is analogously close to the first magnetic member 52, the second magnetic member 53, or the fourth magnetic member 54 to switch the roller 13 to the sectional mode or the non-sectional mode and to adjust the strength of the abutting portion 21 abutting against the annular tooth portion 14.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A roller input device, comprising:
a housing, an interior of the housing being provided with a roller pivotally disposed therein, the roller comprising an annular tooth portion;
a passive member movably disposed inside the housing, the passive member comprising an abutting portion and a first magnetic module; and
an active member comprising a second magnetic module, the active member being disposed in the housing and operably moved to a first mode or a second mode, so that the first magnetic module and the second magnetic module move relatively to make the first magnetic module and the second magnetic module attract or repel each other to drive the passive member to move relative to the housing to a first position or a second position by magnetic force, so as to make the abutting portion move synchronously to abut against or separate from the annular tooth portion.

2. The roller input device of claim 1, wherein the first magnetic module comprises a first magnetic member and a second magnetic member, the second magnetic module comprises a third magnetic member, the third magnetic member and the first magnetic member have different magnetism, the third magnetic member and the second magnetic member have the same magnetism, and while the active member is located at the first mode or the second mode, the third magnetic member and the first magnetic member are close to and attract each other or the third magnetic member and the second magnetic member are close to and repel each other.

3. The roller input device of claim 1, wherein the second magnetic module comprises a first magnetic member and a second magnetic member, the first magnetic module comprises a third magnetic member, the third magnetic member and the first magnetic member have different magnetism, the third magnetic member and the second magnetic member have the same magnetism, and while the active member is located at the first mode or the second mode, the third magnetic member and the first magnetic member are close to and attract each other or the third magnetic member and the second magnetic member are close to and repel each other.

4. The roller input device of claim 2, wherein the interior of the housing is further provided with a first guide member and a second guide member, the passive member is movably disposed on the first guide member, the active member is movably disposed on the second guide member, the first magnetic member and the second magnetic member are arranged along a direction, and the direction is substantially perpendicular to a moving direction of the passive member.

5. The roller input device of claim 4, wherein the passive member is slidably disposed on the first guide member.

6. The roller input device of claim 5, wherein the passive member comprises a long slot, the first guide member comprises a guide pillar, and the guide pillar penetrates into the long slot.

7. The roller input device of claim 4, wherein the passive member comprises a first pivot portion, the first guide member comprises a second pivot portion, and the passive member is pivotally disposed on the second pivot portion by the first pivot portion.

8. The roller input device of claim 4, wherein the second guide member comprises a restriction mechanism, and the restriction mechanism restricts the active member to the first mode or the second mode.

9. The roller input device of claim 3, wherein the interior of the housing is further provided with a first guide member and a second guide member, the passive member is movably disposed on the first guide member, the active member is movably disposed on the second guide member, the first magnetic member and the second magnetic member are arranged along a direction, and the direction is substantially perpendicular to a moving direction of the passive member.

10. The roller input device of claim 9, wherein the passive member is slidably disposed on the first guide member.

11. The roller input device of claim 10, wherein the passive member comprises a long slot, the first guide member comprises a guide pillar, and the guide pillar penetrates into the long slot.

12. The roller input device of claim 9, wherein the passive member comprises a first pivot portion, the first guide member comprises a second pivot portion, and the passive member is pivotally disposed on the second pivot portion by the first pivot portion.

13. The roller input device of claim 9, wherein the second guide member comprises a restriction mechanism, and the restriction mechanism restricts the active member to the first mode or the second mode.

14. The roller input device of claim 1, wherein the interior of the housing is further provided with a resilient return member, and the resilient return member abuts against the second magnetic module.

15. The roller input device of claim 14, wherein a protective layer is disposed between the second magnetic module and the resilient return member.

16. The roller input device of claim 1, wherein the annular tooth portion is disposed on a periphery of the roller.

17. The roller input device of claim 2, further comprising a fourth magnetic member, wherein the fourth magnetic member is close to the first magnetic member and the second magnetic member, and the active member is further operably moved to a third mode to make the third magnetic member be close to the fourth magnetic member.

18. The roller input device of claim 17, wherein the magnetism of the fourth magnetic member is different from that of the first magnetic member or the second magnetic member.

19. The roller input device of claim 17, wherein the fourth magnetic member is away from or close to the third magnetic member relative to the first magnetic member and the second magnetic member.

20. The roller input device of claim 3, further comprising a fourth magnetic member, wherein the fourth magnetic member is close to the first magnetic member and the second magnetic member, and the active member is further operably moved to a third mode to make the third magnetic member be close to the fourth magnetic member.

21. The roller input device of claim 20, wherein the magnetism of the fourth magnetic member is different from that of the first magnetic member or the second magnetic member.

22. The roller input device of claim 20, wherein the fourth magnetic member is away from or close to the third magnetic member relative to the first magnetic member and the second magnetic member.

* * * * *